United States Patent [19]
Parris et al.

[11] Patent Number: 5,767,417
[45] Date of Patent: Jun. 16, 1998

[54] SWIM METER

[75] Inventors: James E. Parris; John L. Lawless, both of Pacifica, Calif.

[73] Assignee: Redwood Scientific Incorporated, Pacifica, Calif.

[21] Appl. No.: 688,893

[22] Filed: Jul. 31, 1996

[51] Int. Cl.$^6$ .................................................. G01F 1/00
[52] U.S. Cl. .............................................................. 73/861
[58] Field of Search ............................... 377/2, 5, 24.2; 73/861.77, 861.79, 170.05, 170.12, 170.13, 170.14, 170.15, 170.16

[56] References Cited

U.S. PATENT DOCUMENTS

| | | | |
|---|---|---|---|
| 3,685,353 | 8/1972 | Gestler et al. | 73/861.78 |
| 3,729,993 | 5/1973 | Eck et al. | 73/181 |
| 4,780,085 | 10/1988 | Malone | 434/254 |
| 4,896,534 | 1/1990 | Daly | 73/189 |
| 4,932,045 | 6/1990 | Kasoff et al. | 377/24.2 |
| 5,124,960 | 6/1992 | Miller et al. | 368/278 |
| 5,136,621 | 8/1992 | Mitchell et al. | 377/24.2 |
| 5,417,599 | 5/1995 | Evans | 441/64 |

Primary Examiner—Richard Chilcot
Assistant Examiner—Jewel V. Artis
Attorney, Agent, or Firm—Townsend and Townsend and Crew LLP; Henry K. Woodward

[57] ABSTRACT

A swim meter to be worn by a swimmer and indicating swim speed, swim distance, elapsed time and other measurements includes a housing to be worn on the body of a swimmer with a mechanism mounted to the housing and responsive to the flow of water in generating an electrical signal indicative of swimmer movement in the water. A display is mounted to the housing or separately on the swimmer for viewing by the swimmer, and a computer mounted inside the housing generates display drive signals in response to the signals from the drive mechanism. The drive mechanism can comprise a rotating element, such as a paddle wheel, turbine, propeller, or pinwheel, or the drive mechanism can be a pitot tube and pressure sensor, a current generator responsive to salt ions in the water, or a voltage generator. The computer can be responsive to electrical or mechanical signals.

31 Claims, 5 Drawing Sheets

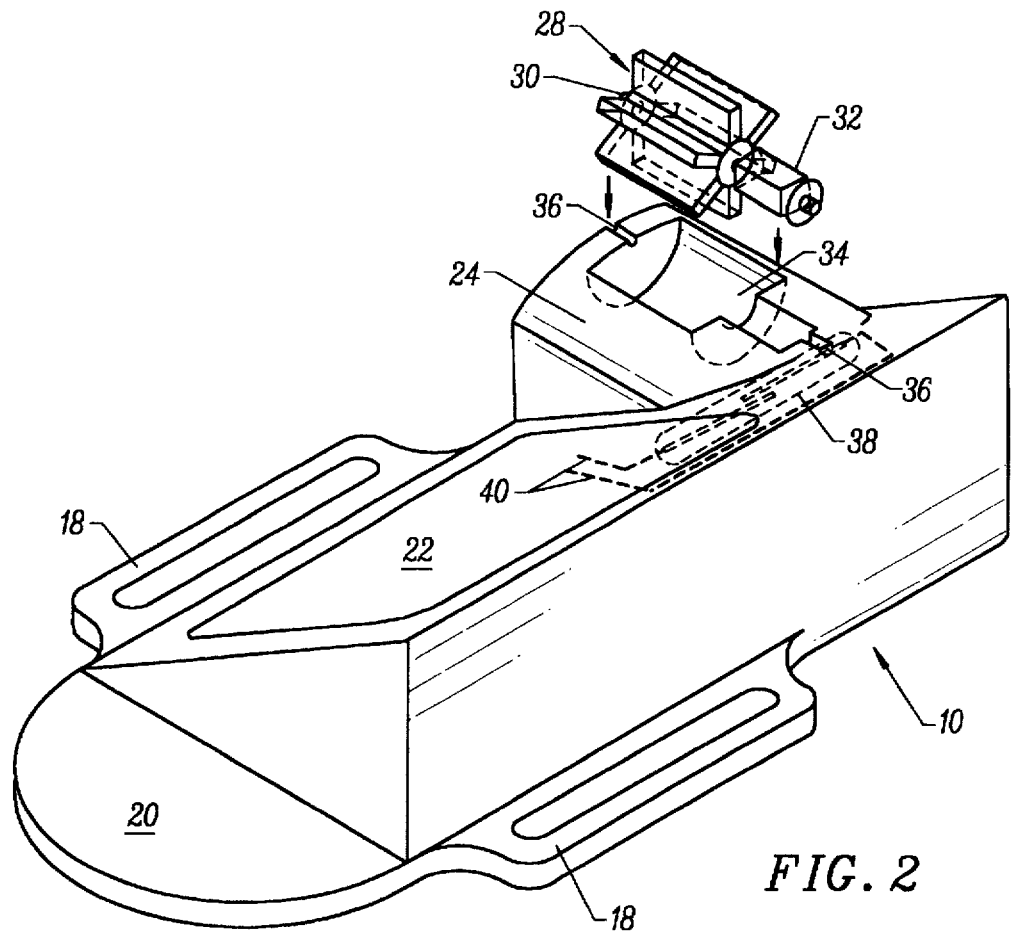
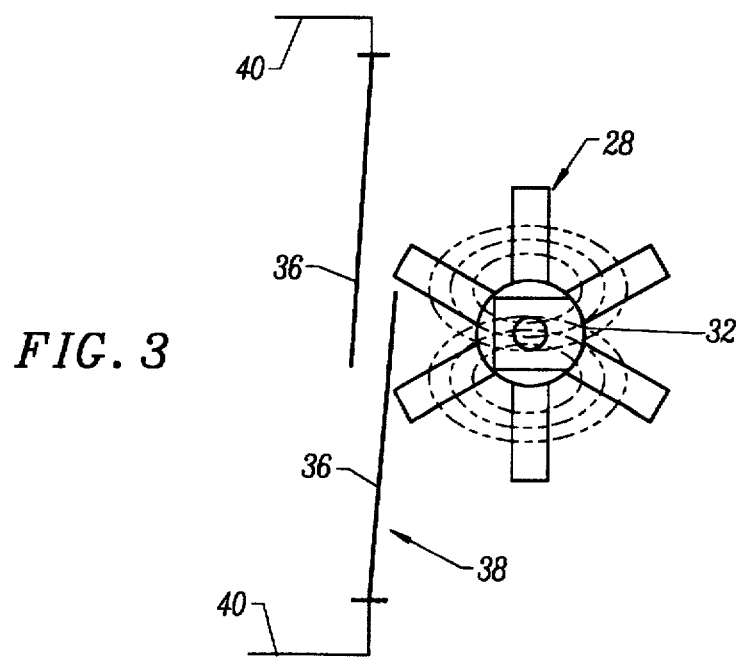

SWIM METER

BACKGROUND OF THE INVENTION

This invention relates generally to a swimming instrument to be worn by a swimmer to indicate a measure of swimming activity, and more particularly, the invention relates to an estimate which responds to flow of water over the swimmer.

A number of instruments are known which can provide a measure of laps completed or of elapsed time in swimming. See, for example, U.S. Pat. No. 5,124,960 in which a swimmer wears a counter on the wrist and a pressure transducer on the finger with wire or microwave links provided for signalling between the transducer and counter. Timekeeping circuitry can be included with the counter. U.S. Pat. No. 4,932,045 discloses a lap counter worn by a swimmer, and U.S. Pat. No. 5,136,621, discloses a lap counter and timer which is positioned in a pool for counting laps of a swimmer passing thereover and having a display which can be read by the swimmer when passing over the counter.

"While such timers and counters are capable of determining average swimming speed by dividing a pre-determined distance (25 meter pool width is 1 lap) by elapsed time, none of these devices are capable of providing average swimming speed when the distance (lap) completed is of unknown size, i.e. arbitrary sized pools, lakes, oceans etc. Further, none of these devices is capable of providing current speed and distance completed to the swimmer while swimming."

SUMMARY OF THE INVENTION

In accordance with the present invention, speed of a swimmer is determined by measuring the flow of water over the body of the swimmer. A computer worn by the swimmer and coupled to the flow measurement instrument provides a measure of speed, distance, or time of the swimmer moving through water. A display driven by the computer is positioned for ready viewing by the swimmer. The computer can be calibrated for any pool size to provide number of laps swam in addition to distance completed.

More particularly, a swim meter in accordance with the invention is worn on the body of the swimmer, such as on the chest, waist, or upper leg, for example, with the display arranged for ease of viewing. A water flow mechanism, such as a propeller, water wheel, turbine, or pinwheel, for example, is driven by water flowing over the body of the swimmer. The mechanism generates an electrical or mechanical signal which is transmitted to the computer which processes the signal and drives the display. The computer can comprise of a microprocessor, a counter, logic circuitry, gear train or other suitable means for providing a measure of swim activity in response to an electrical or mechanical signal. Rather than using a mechanical drive, the signal can be generated by a pressure sensor, pitot tube, or other suitable signal generation means. A memory can be provided to keep statistics on a swimmer's workout and provide a histogram of workouts.

In one specific embodiment, a paddle wheel has a rotating axle which also functions as a mount in the instrument. A magnet attached to the axle actuates a microswitch as the paddle wheel is rotated. The switch can be an electromagnetic sensor or a mechanical switch such as a reed switch. The switch is triggered by the moving magnet, and the resulting signal is sent to a microprocessor which is programmed to drive a display.

The display can be an integral part of the swim meter housing or a separate device coupled to the swim meter by electromagnetic or acoustic means. In accordance with another embodiment, the meter can be entirely mechanical in generating a signal, computing a measure of swim activity, and driving a display.

The invention and objects and features thereof will be more readily apparent from the following description and dependent claims when taken with the drawings.

BRIEF DESCRIPTION OF THE DRAWINGS

FIG. 2 is a perspective view partially exploded of the swim meter of FIG. 1.

FIG. 3 is an end view of a paddle wheel mechanism in the swim meter of FIG. 1.

DESCRIPTION OF THE PREFERRED EMBODIMENT

Figure 1:
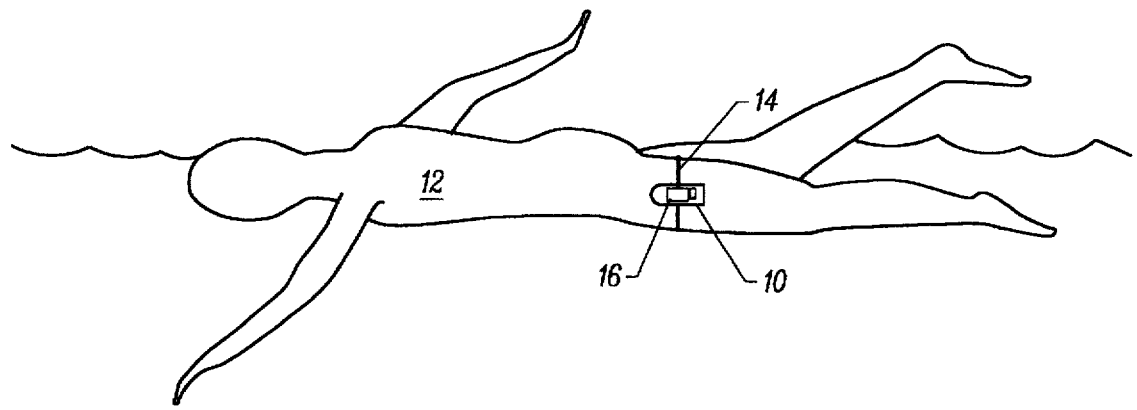
FIG. 1 illustrates a swim meter in accordance with one embodiment of the invention attached to a swimmer.

Referring now to the drawing, FIG. 1 illustrates a swim meter 10 in accordance with one embodiment of the invention attached to the leg of a swimmer 12 which provides a readout of swim distance completed in response to the flow of water over the body of the swimmer. Swim meter 10 is readily attached by means of a belt 14 on the upper leg, or on the waist or chest. The swim meter includes a display 16 which is positioned for ready viewing by the swimmer.

FIG. 2 is a perspective view partially exploded of the swim meter 10 of FIG. 1. The swim meter includes a housing having a base portion 20 for abutting the body of the swimmer, an inclined display surface 22 for viewing by the swimmer, and a support portion 24 for a mechanism for generating an electrical signal in response to the flow of water. A cavity is defined between the base portion 20 and the display surface 22 for accommodating a computer such as a microprocessor, which is responsive to electrical signals from the mechanism for generating electrical signals and driving a liquid crystal display or the like on the surface 22 of the housing. Ears 18 protrude from base 20 for accommodating a belt or other fastener.

In the embodiment of FIG. 2, the mechanism for generating electrical signal in response to the flow of water comprises a paddle wheel 28 mounted on an axle 30 with a magnet 32 positioned on the axle 30 at one end of paddle wheel 28. Paddle wheel 28 is received in a recess 34 of the display housing with the ends of the axle 30 received in grooves 36 at either end of the recess 34. A magnet-activated switch 38, such as a reed switch, is positioned near the magnet 32 as illustrated in the end view of FIG. 3, with the switch being temporarily closed as the paddle wheel 28 and magnet 32 are rotated. Leads 40 connect the switch to the computer mounted within the housing.

Figure 4:
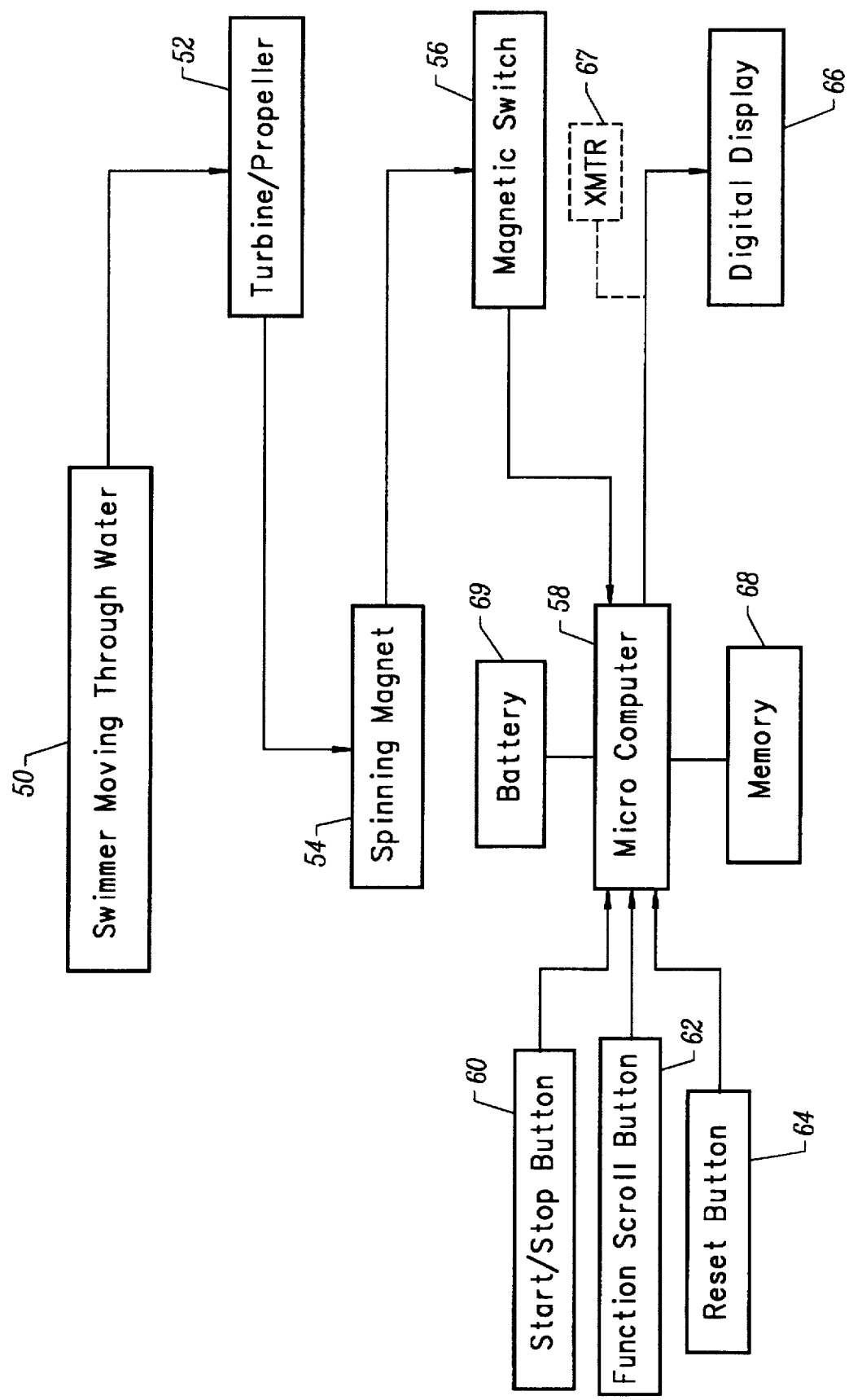
FIG. 4 is a functional diagram of a swim meter in accordance with one embodiment of the invention.

FIG. 4 is a functional block diagram of the swim device and illustrates operation thereof. The swimmer moving through the water at 50 causes a flow of water over the paddle wheel, turbine or propeller at 52, which spins the magnet as illustrated at 54. Spinning magnet 54 repeatedly closes magnetic switch at 56 which is electrically biased to provide electrical pulses to a microcomputer at 58 with the rate of the pulses being indicative of the rotation of the drive mechanism and thus the flow of water over the swimmer. Microcomputer 58 responds to a start/stop button 60, a function scroll button 62, and a reset button 64 for driving a digital display 66 and for the storing of swim data in a memory 68. A transmitter 67 is required for the embodiment of FIG. 7, infra. A battery 69 powers the swim meter. Importantly, the swim meter enables a swimming athlete to download a record of the swimmer's workout to an external personal computer and generate histograms and statistics for monitoring swim progress.

The drive mechanism can be a paddle wheel as shown in FIGS. 2 and 3, or other suitable drive mechanisms such as a propeller, pinwheel, Pitot tube and pressure sensor, or an instrument for measuring salt ions in the water to generate a current. The electrical signal can be pulses, as described, or a generated electrical voltage. With an AC generator, the frequency of the generated voltage will be indicative of water flow and swim speed.

Figure 5:
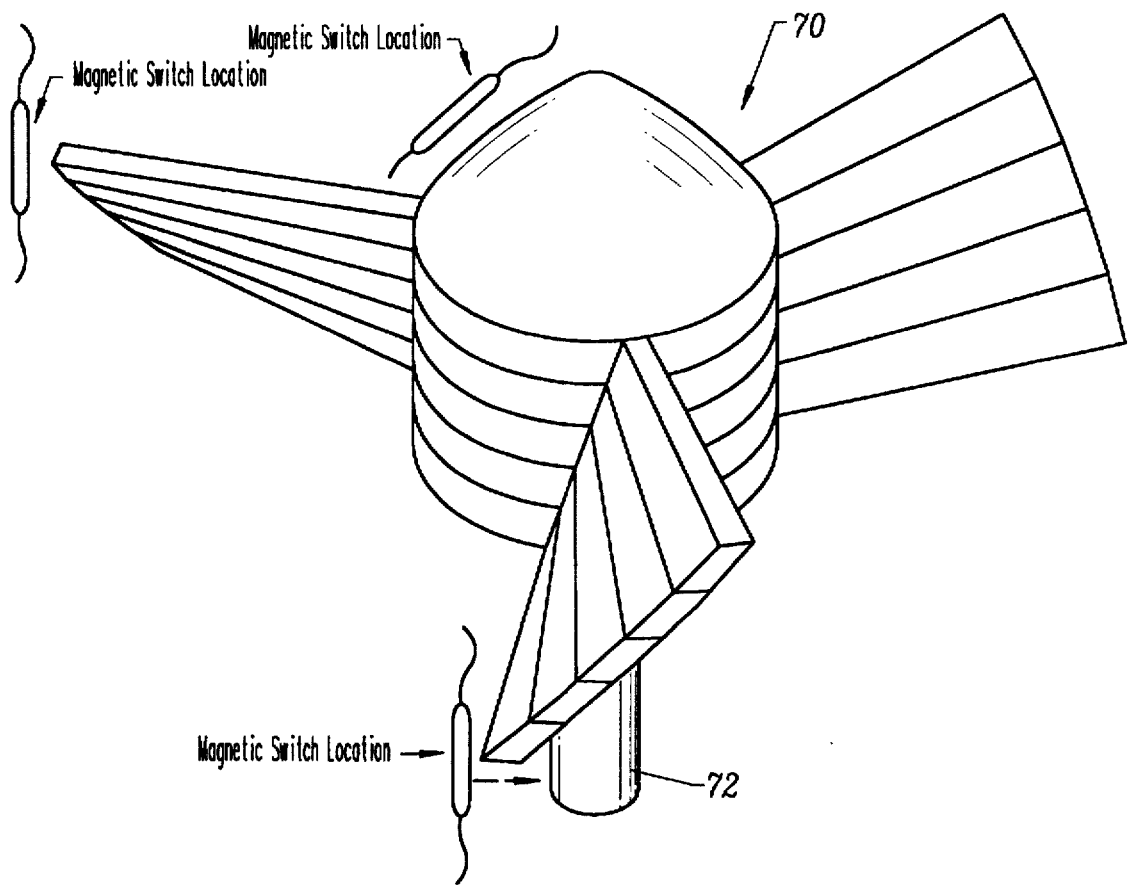
FIG. 5 is a perspective view of a propeller mechanism for use in the swim meter in accordance with another embodiment of the invention.

FIG. 5 is a perspective view of a hydrodynamic propeller which can be used to drive an axle to rotate the magnet for actuating the magnetic switch. The axle 72 is in-line to the direction of water flow, and a magnet is attached to the rotating axle along the side or at the end. The magnetic switch can be placed in any orientation that is within proximity of the spinning magnetic field. For example, the magnets can be placed in the propeller blades with the magnetic switch being placed near the region being swept by the propeller. Alternatively, the leading edge cone of the propeller can contain a magnet with a magnetic switch configured within the magnetic field pattern which senses magnetic flux.

Figure 6A:
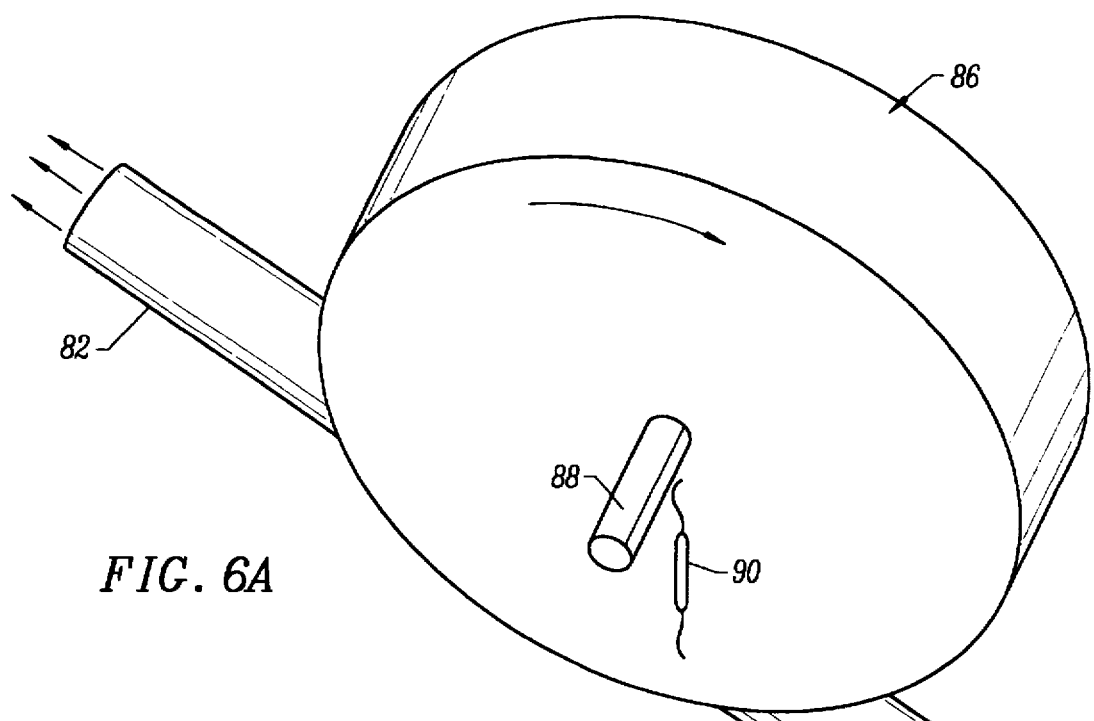
FIGS. 6A, 6B are perspective views of a pinwheel mechanism in accordance with another embodiment of the invention.
Figure 6B:
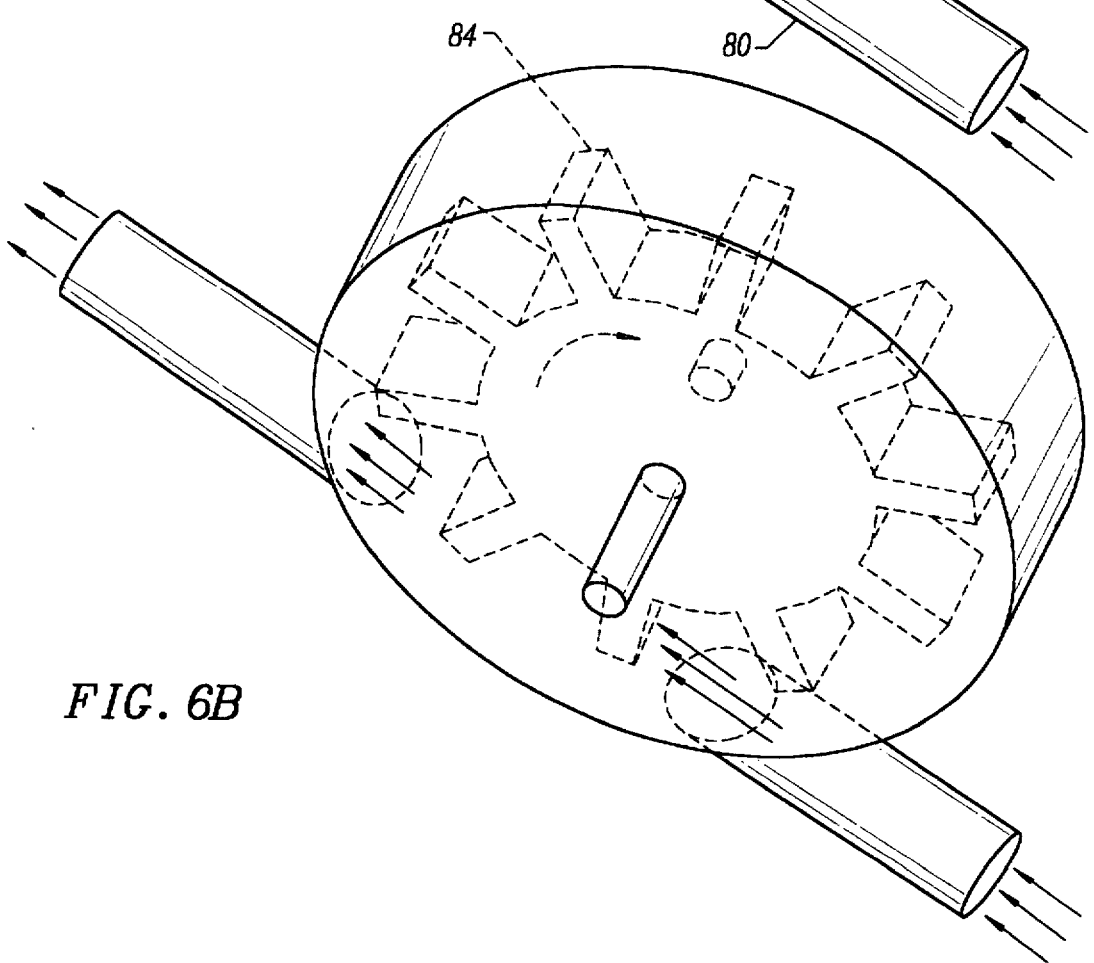

FIGS. 6A, 6B are perspective views of another embodiment of the drive mechanism in which the paddle wheel is replaced by a pinwheel. The pinwheel has a water entrance port 80 and a water exit port 82 which drives a pinwheel 84 within the pinwheel housing 86. Again, a magnet is positioned on the protruding axle 88 with the magnetic switch 90 positioned in close proximity thereto for actuation in response to the rotating magnetic field. The pinwheel rotates on one pinion, bearing, and one axle, with the axle extending outside the housing. The magnet can be attached to the axle outside of the housing.

Figure 7:
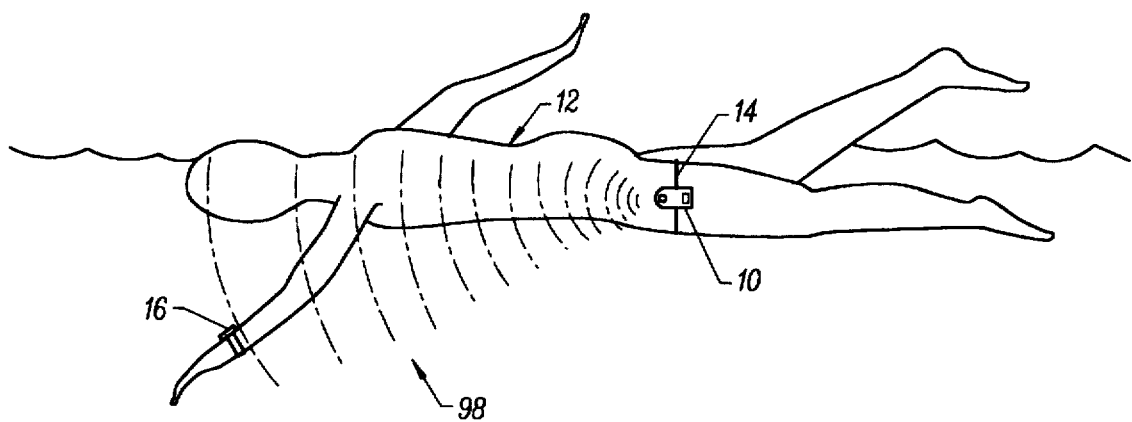
FIG. 7 illustrates another embodiment of the invention.

FIG. 7 is similar to FIG. 1 and illustrates another embodiment of the invention. Like elements have the same reference numerals. In this embodiment, the display 16 is separate from the housing of swim meter 10 and is coupled thereto by means of acoustic or ultrasonic waves 98 from a transmitter in the housing of swim meter 10. By wearing the display on the swimmer's wrist, information can be viewed more easily. As the wrist passes through the water with each stroke, information from the display is updated with the most recent swimming data, the computer and drive assembly housing can then be significantly reduced in size.

The present invention permits swimmers to measure their distance completed and speed while they are swimming. Further, the computer and memory enable a swimming athlete to download a record of the swimmer's workout and generate histograms and statistics to monitor swimming progress. Accordingly, improved fitness for the swimmers is provided by monitoring their day-to-day measurements including completed distance, improve skill for competitive swimmers through monitoring of push-off speeds, the automatic lap counting eliminates the need to keep track of laps swam, and the measurement of distance traveled can be used also by divers for navigation. The computer can be readily programmed to provide speed and distance, and a lap counter can be calibrated for any pool size to thereby provide number of laps complete.

While the invention has been described with reference to specific embodiments, the description is illustrative of the invention and is not to be construed as limiting the invention. For example, the computer can be a mechanical assembly such as a gear train which responds to mechanical signals. Thus, an entirely mechanical swim meter can be implemented. Various other modifications and applications may occur to those skilled in the art without departing from the true spirit and scope of the invention as defined by independent claims.

What is claimed is:

1. A swim meter comprising:
   a housing to be worn on the body of a swimmer,
   a mechanism mounted to said housing and responsive to the swimmer moving through the water in generating a signal indicative of swimmer movement in water,
   a display for viewing swimming information generated by the mechanism, and
   a computer mounted in said housing for generating display drive signals in response to said signal.

2. The swim meter as defined by claim 1 wherein said housing is configured to smoothly pass the flow of water over said housing.

3. The swim meter as defined by claim 1 and further including an attachment mechanism for attaching said housing to the body of a swimmer.

4. The swim meter as defined by claim 3 wherein said attachment mechanism comprises a belt, said housing having protruding ears for receiving said belt.

5. The swim meter as defined by claim 1 wherein said display is imbedded in said housing.

6. The swim meter as defined by claim 1 and further including a transmitter in said housing, said display being positioned away from said housing and coupled to said computation means by said transmitter.

7. The swim meter as defined by claim 1 wherein said mechanism comprises a rotating element, a magnet on said rotating element, and a on/off switch responsive to said magnet.

8. The swim meter as defined by claim 7 wherein said rotating element comprises a finned wheel.

9. The swim meter as defined by claim 7 wherein said rotating element comprises a turbine.

10. The swim meter as defined by claim 7 wherein said rotating element comprises a propeller.

11. The swim meter as defined by claim 7 wherein said rotating element comprises a pinwheel.

12. The swim meter as defined by claim 1 wherein said computer generates a signal indicative of at least one swim measure selected from a group consisting of average swim speed, maximum swim speed, instantaneous swim speed, distance traveled, swim time and laps swam.

13. The swim meter as defined by claim 1 wherein said computer calculates distance by time and generates signals indicative of average speed and maximum speed.

14. The swim meter as defined by claim 1 wherein said computer provides a lap counter.

15. The swim meter as defined by claim 1 wherein said mechanism comprises a rotating element.

16. The swim meter as defined by claim 1 wherein said mechanism comprises a pitot tube and pressure sensor.

17. The swim meter as defined by claim 1 wherein said mechanism comprises a current generator responsive to salt ions in the water.

18. The swim meter as defined by claim 1 wherein said mechanism comprises an electrical generator.

19. The swim meter as defined by claim 12 wherein said electrical generator is an AC generator for generating a variable frequency electrical signal, the frequency being indicative of swim speed.

20. The swim meter as defined by claim 1 wherein said computer is selected from a group consisting of a microprocessor, a counter, a timer, and a logic circuit.

21. The swim meter as defined by claim 1 wherein said computer comprises a mechanical computer.

22. A swim meter to be worn on the body of a swimmer for indicating swim speed including a housing, a fastener for fastening the housing on the swimmer, a computer in the housing for computing swim speed, and a display driven by the computer for indicating swim speed, characterized by a mechanism associated with the housing and responsive to the flow of water and generating an electrical signal indicative of swimmer movement in water.

23. The swim meter as defined by claim 22 wherein said mechanism comprises a rotating element.

24. The swim meter as defined by claim 23 wherein said rotating element comprises a paddle wheel.

25. The swim meter as defined by claim 23 wherein said rotating element comprises a turbine.

26. The swim meter as defined by claim 23 wherein said rotating element comprises a pinwheel.

27. The swim meter as defined by claim 22 wherein the rotating element comprises a pitot tube and pressure sensor.

28. The swim meter as defined by claim 22 wherein said mechanism comprises a current generator responsive to salt ions in the water.

29. The swim meter as defined by claim 22 wherein said mechanism comprises a rotating element, a magnet on said rotating element, and a magnetic sensor responsive to said magnet.

30. The swim meter as defined by claim 22 wherein said mechanism comprises an electrical generator.

31. A housing for a swim meter to be worn on the body of a swimmer for viewing by the swimmer comprising:

a base portion for abutting the body of the swimmer, and inclined display surface for accessible viewing by the swimmer, and a support portion for supporting a mechanism generating an electrical signal in response to the flow of water.

* * * * *